(12) United States Patent
Dadourian

(10) Patent No.: US 6,796,656 B1
(45) Date of Patent: Sep. 28, 2004

(54) GENERATING A MATTE SIGNAL FROM A RETRO REFLECTIVE COMPONENT OF A FRONT PROJECTION SCREEN

(75) Inventor: Arpag Dadourian, Northridge, CA (US)

(73) Assignee: Imatte, Inc., Chatsworth, CA (US)

( * ) Notice: Subject to any disclaimer, the term of this patent is extended or adjusted under 35 U.S.C. 154(b) by 0 days.

(21) Appl. No.: 10/601,299

(22) Filed: Jun. 14, 2003

(51) Int. Cl.[7] .................. G03B 21/26; G03B 21/00; H04N 9/74
(52) U.S. Cl. ............. 353/28; 353/122; 353/121; 348/586
(58) Field of Search .............. 353/97, 79, 80, 353/122, 121, 28, 21, 29; 356/51, 615, 621, 622; 348/586, 590; 359/452, 454, 459; 396/3

(56) References Cited

U.S. PATENT DOCUMENTS

| | | | |
|---|---|---|---|
| 6,454,415 B1 * | 9/2002 | Vlahos | 353/30 |
| 6,473,115 B1 * | 10/2002 | Harman | 348/51 |
| 6,554,434 B2 * | 4/2003 | Sciammarella et al. | 353/98 |
| 6,598,979 B2 * | 7/2003 | Yoneno | 353/122 |
| 2002/0093666 A1 * | 7/2002 | Foote et al. | 356/621 |
| 2003/0227470 A1 * | 12/2003 | Genc et al. | 345/633 |

OTHER PUBLICATIONS

Leibe et al. The Perceptive Workbench: Toward Spontaneous and Natural Interaction in Semi–Immersive Virtual Environments.,3/2000, Proceedings of IEEE Virtual REality 2000 as found at http://www.gvu.gatech.edu/ccg/publications.html.*

* cited by examiner

*Primary Examiner*—Rodney Fuller
*Assistant Examiner*—Andrew Sever
(74) *Attorney, Agent, or Firm*—Blakely Sokoloff Taylor & Zafman

(57) ABSTRACT

A white projection screen containing a small number of infrared retro reflective elements, uniformly distributed over the screen's surface, is illuminated by an infrared source and observed by a coaxially located infrared camera. A matte signal is generated utilizing a high signal level from the infrared camera in all unobscured areas on the screen, and a very low signal level in screen areas obscured by a presenter between a projector and the projection screen.

13 Claims, 4 Drawing Sheets

GENERATING A MATTE SIGNAL FROM A RETRO REFLECTIVE COMPONENT OF A FRONT PROJECTION SCREEN

BACKGROUND OF THE INVENTION

U.S. Pat. No. 6,361,173, describes an image projection system in which a matte signal selectively inhibits the projected image within the silhouette area of a presenter when in front of the projection screen.

In the U.S. patent application Ser. No. 10/370,356, a projected infrared pattern on the presenter is displaced from the surrounding pattern on the unobscured screen area when viewed by an infrared camera displaced a few inches from an infrared projector. Except in the area of the presenter, the two patterns subtract to zero.

The complexity of projecting an infrared non-repetitive pattern and obtaining a camera image of such a pattern at high resolution has lead to the development of a less complex matte generation method described below.

BRIEF SUMMARY OF THE INVENTION

A white projection screen containing a small number of infrared retro reflective elements, uniformly distributed over the screen's surface, is illuminated by an infrared source and observed by a coaxially located infrared camera. A matte signal is generated utilizing a high signal level from the infrared camera in all unobscured areas on the screen, and a very low signal level in screen areas obscured by a presenter between a projector and the projection screen.

DETAILED DESCRIPTION OF THE INVENTION

Figure 1:
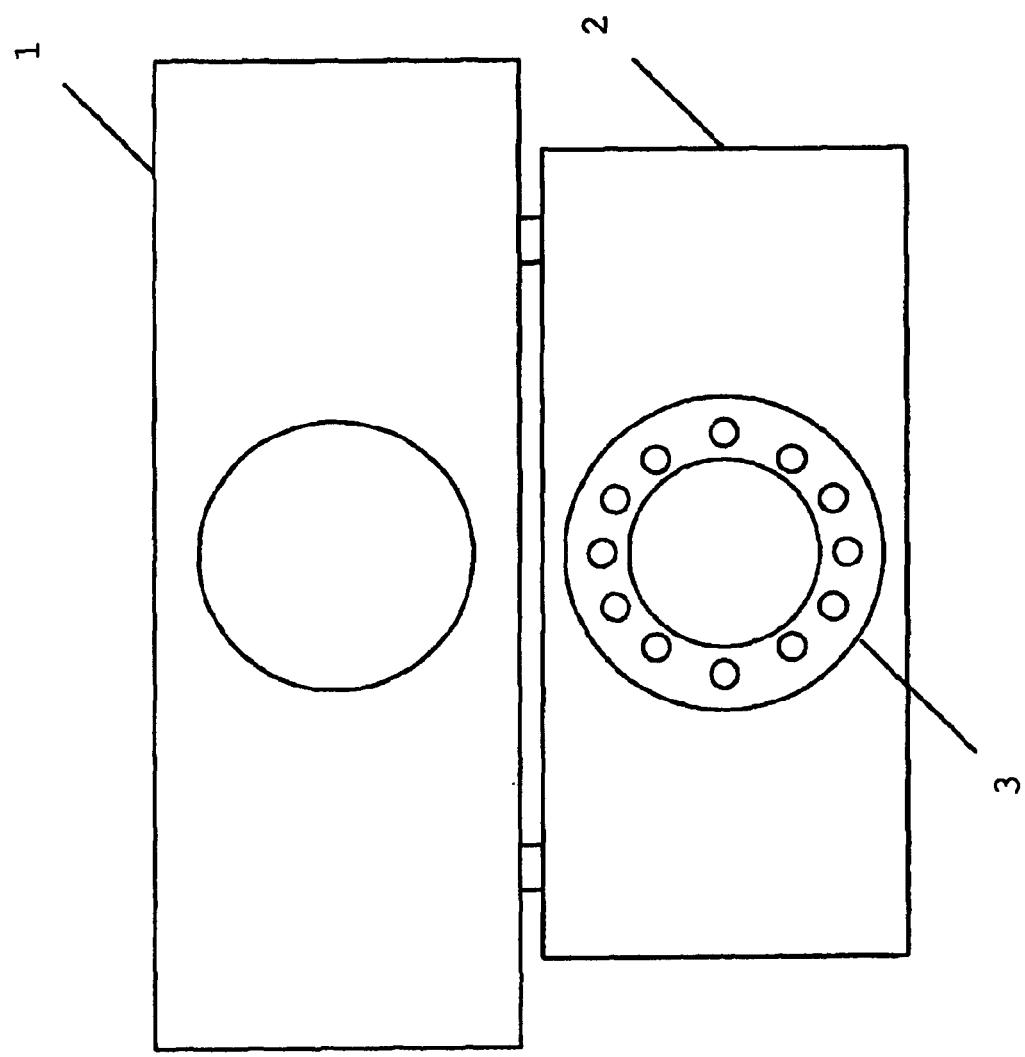
FIG. 1 shows a view of a color projector, an IR illuminator, and an IR camera.

Referring to FIG. 1, a presenter standing in front of a projection screen, looking out over an auditorium would typically see electronic color projector 1 mounted above the viewing audience. This projector projects the presenter's data images. Infrared (IR) camera 2, and a coaxial infrared illuminator 3, are attached to or located very close to color projector 1.

A white front-projection screen provides a uniform 180-degree brightness distribution of images being projected upon it. A projected image will be equally bright as seen from all viewing positions. When coated by a high brightness white pigment, this screen will have a "gain" of unity (1.0).

Figure 2:
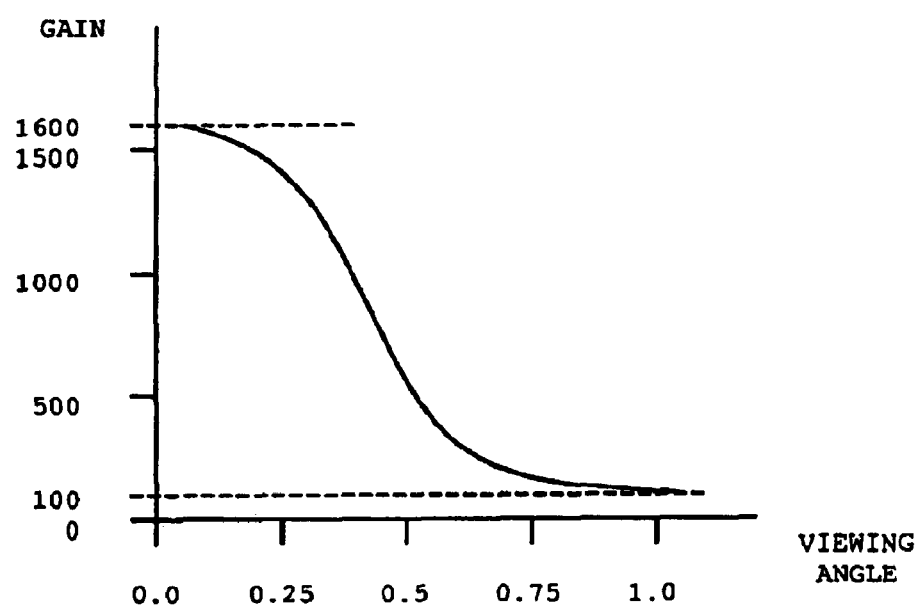
FIG. 2 is a curve of gain as a function of off-axis viewing angle for Scotchlite 7610 retro reflective screen material.

A retro reflective material will reflect incident illumination back to its source. It can have a very high "brightness gain", however this high brightness gain can be seen only when the "observer" is directly behind the source of illumination. FIG. 2 is a gain curve versus viewing angle of retro reflective Scotchlite screen material 7610, which has a peak gain of 1,600.

In this invention retro reflective elements are incorporated into a white projection screen and are of such small size as to be invisible to front row viewers. These retro reflective elements need not occupy more than about five percent of the total screen surface area.

Assuming a total retro reflective area of five percent of screen area and a gain of 1,600, the effective gain is their product of 80, as compared to a gain of up to 1.0 for the presenter. This 80/1 ratio is reduced by the losses in recovering retro reflected illumination from the screen.

Figure 3:
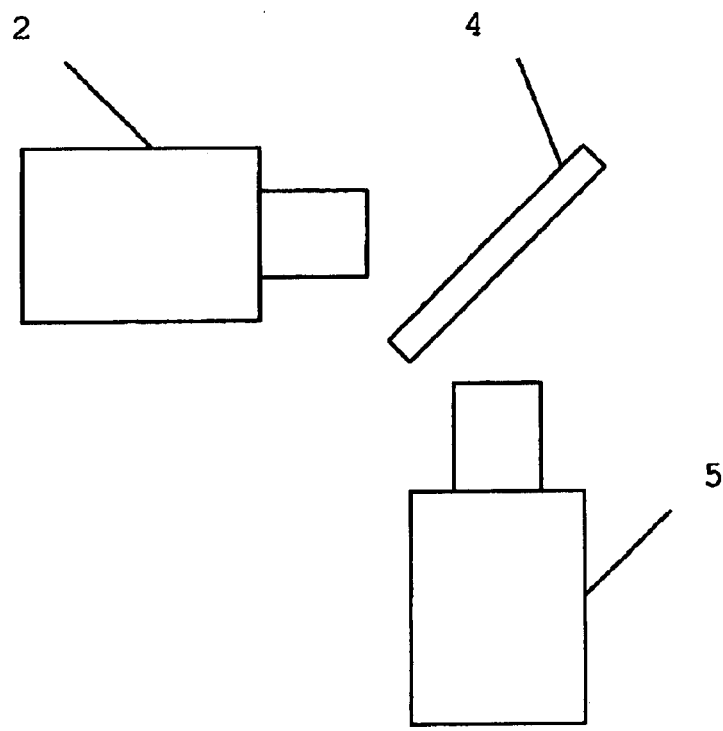
FIG. 3 is a view of an infrared illuminator, beam splitter, and coaxial IR camera.

The IR illuminator 3 of FIG. 1 provides the greatest effective retro reflective gain when coaxial with the IR camera 2 lens. FIG. 3 shows the use of a beam splitter 4 and infrared source 5 to illuminate the screen on the axis of the IR camera lens. The semi-mirror of FIG. 3 is usually on a 45-degree angle with respect to the IR camera lens and infrared source. The efficiency of a same-color beam splitter is the product of the percentage split. Thus the highest efficiency is 25 percent and is achieved with a 50/50 splitter.

Figure 4:
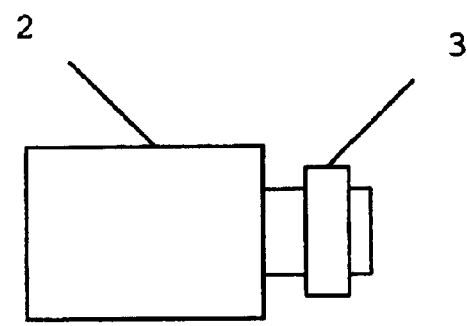
FIG. 4 is a view of an infrared camera whose lens is ringed with IR emitting diodes.

An alternative to a beam splitter is to place a ring 3 of IR emitting diodes around the lens of camera 2 as shown in FIG. 4. While the IR illuminator ring is coaxial with the camera lens axis, its large aperture will cause much of the reflected IR to fall outside of the camera lens aperture. By either method the gain of 80 is reduced to approximately 20.

In this invention, no infrared pattern is required. The retro reflective component of the projection screen provides adequate separation between screen and presenter.

An infrared source 3, of FIG. 1, illuminates the entire projection screen with non-visible infrared illumination. The "observer" in this application is infrared camera 2, located coaxially with IR illuminator 3. The IR camera will not see the presenter's data images because electronic data projector 1 does not emit significant amounts of IR. A beam splitter with uniformly illuminated optics can provide reasonably uniform IR illumination on the projection screen. Camera 2 sees a dark silhouette of the presenter against a brightly illuminated field. This infrared camera signal is a linear matte signal and, preferably with a small offset to ensure that the presenter is completely covered, may be used to selectively inhibit the light output from a presenter's data projector to prevent light from the projector being projected on the presenter as described in U.S. Pat. No 6,361,173.

The linear matte signal may be converted to a binary matte signal by assigning a matte signal of 0.0 when the camera signal is below a selected threshold, and by assigning a matte signal of 1.0 when the camera signal is above the selected threshold. The binary matte signal tolerates wide variations in uniformity of screen illumination and in reflection uniformity of the retro reflector elements.

As is well know in the art, a binary matte can be smoothed, sized and defocused to provide a solid, well fitting, soft-edged matte.

Figure 5:
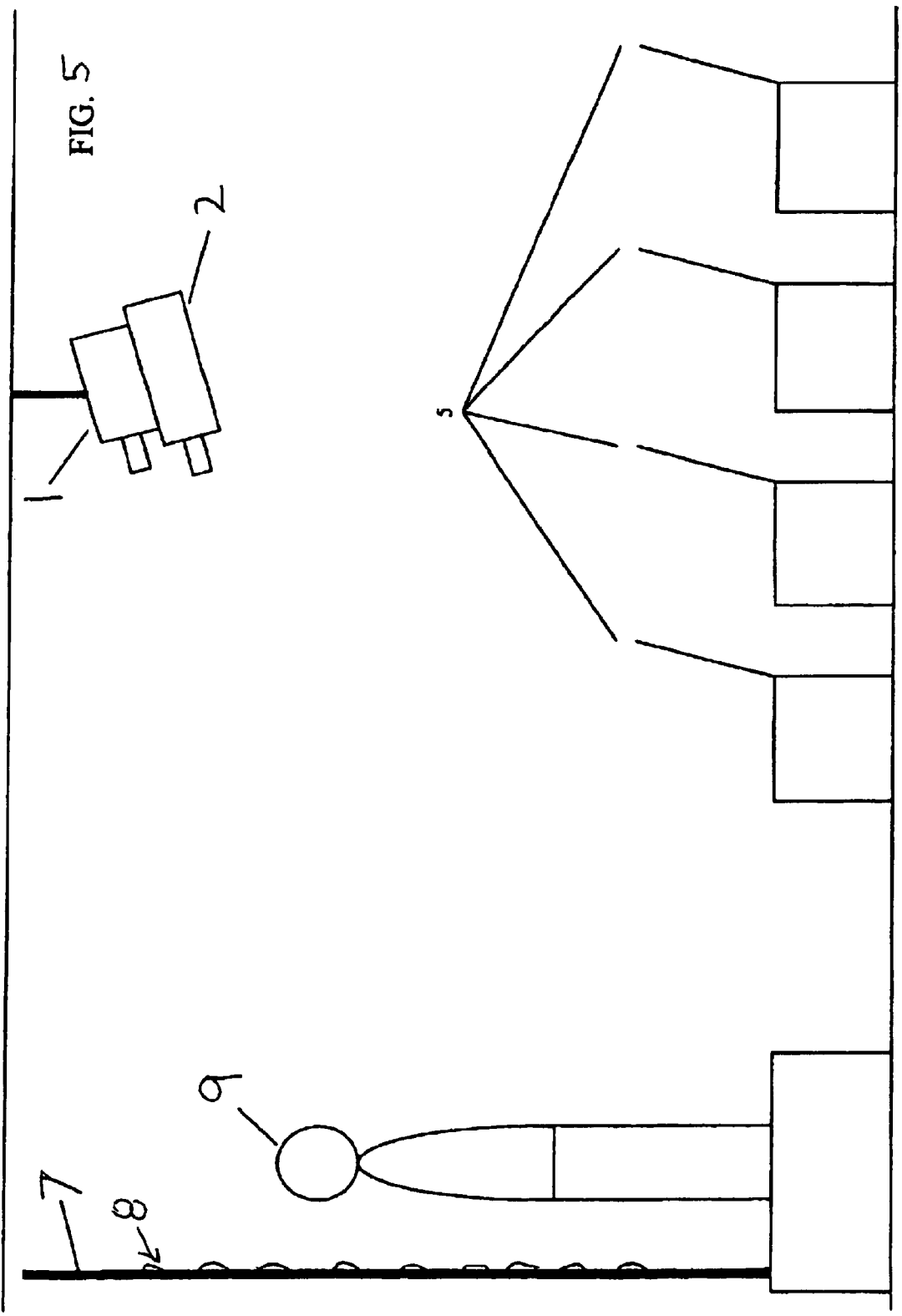
FIG. 5 is a view showing the relative position of a projection screen, retro reflective elements, presenter, color image projector and IR camera according to the present invention.

FIG. 5 shows the relative positions of a projection screen 7, retro reflective elements 8, presenter 9, color image projector 1 and IR camera 2 according to the present invention. Coaxial infrared illuminator 3 is contained within camera 2 and does not appear in this side view. Further, retro reflective elements 8 are shown much larger than actual size since the actual size of such elements is very small.

Implementation

In one embodiment, a white projection screen, containing uniformly distributed retro reflective components, can be constructed by selectively coating a 7610 Scotchlite or equivalent material screen with white pigment where the screen is to be white, while avoiding those areas that will constitute the retro reflective elements. This selective coating can be applied using a silkscreen printing process. By selecting a sufficiently fine dot pattern, the retained retro reflective elements formed by the 7610 Scotchlite or equivalent material will be small enough to be invisible to front row observers.

Alternatively, the retro reflective elements may be integrated into a white screen's surface during its manufacture.

Many small video cameras have sufficient sensitivity in the near infrared range beyond 700 nanometers. These cameras are suitable for use as the infrared camera 2 of FIGS. 1, 3 and 4. An infrared pass-band filter over the camera lens eliminates camera response to visible light.

What is claimed is:

1. A method for generating a matte signal identifying the silhouette area of a presenter in front of a projection screen onto which a projector displays images, said method comprising:

a) placing an infrared camera and an infrared illumination source in proximity to each other and to said projector;

b) illuminating said projection screen and said presenter with infrared illumination from an infrared source, said projection screen containing retro reflective elements;

c) observing said screen and said presenter with said infrared camera whose infrared signal levels constitute a linear matte signal defining the presenter's silhouette area;

d) using said matte signal to inhibit visible light emitted from said image projector.

2. The method of claim 1 in which said infrared source is located coaxially with an axis of a lens of said infrared camera.

3. The method of claim 2 in which said infrared source is made coaxial with said infrared camera lens axis by using an infrared beam splitter before said camera lens.

4. The method of claim 2 in which said infrared source is made coaxial with said infrared camera lens axis by using a ring of infrared emitting diodes placed around a barrel of said infrared camera lens.

5. The method of claim 1 in which said infrared camera includes a filter to block passage of visible light.

6. The method of claim 1 in which said linear matte signal is assigned a signal level of 0.0 for those camera signal levels below a selected threshold, and assigned a signal level of 1.0 for signal levels above said selected threshold thereby generating a binary matte signal.

7. The method of claim 1 in which said projection screen provides an essentially uniform brightness distribution to a viewing audience, and said included retro reflective elements provide a very high gain as seen from the position of an infrared illumination source.

8. The method of claim 1 in which said retro reflective screen elements are of such a size as to be substantially invisible to a front row audience.

9. The method of claim 1 in which said projection screen containing retro reflective elements is created by silkscreen printing of a selected pattern with a white pigment onto a high gain retro reflective projection screen.

10. The method of claim 9 in which said selected pattern blocks the transfer of white pigment onto very small dot-like areas uniformly distributed over said screen area.

11. The method of claim 10 in which said dot-like areas occupy approximately 5% of the total screen area.

12. A system for selectively inhibiting light emitted from an image projector comprising:

a) an infrared camera disposed adjacent to an infrared illumination source and to said image projector, b) means for generating a matte signal identifying a silhouette area of a presenter in front of a projection screen containing retro reflective elements utilizing infrared signals from said infrared illumination source reflected from said retro reflective elements.

13. The system defined by claim 12 wherein said generating means comprises said infrared camera operating to sense infrared illumination reflected by said retro reflective elements.

* * * * *